US008171690B2

(12) United States Patent
Ghatikar et al.

(10) Patent No.: US 8,171,690 B2
(45) Date of Patent: May 8, 2012

(54) COUNTERSUNK FASTENER ASSEMBLIES, PANEL MOUNTING SYSTEMS, AND METHODS

(75) Inventors: Venugopal R. Ghatikar, Salt Lake City, UT (US); Bryan K. Harris, Sandy, UT (US)

(73) Assignee: 3form, Inc., Salt Lake City, UT (US)

( * ) Notice: Subject to any disclaimer, the term of this patent is extended or adjusted under 35 U.S.C. 154(b) by 41 days.

(21) Appl. No.: 12/992,329

(22) PCT Filed: Feb. 17, 2009

(86) PCT No.: PCT/US2009/034277
§ 371 (c)(1),
(2), (4) Date: Nov. 12, 2010

(87) PCT Pub. No.: WO2009/145938
PCT Pub. Date: Dec. 3, 2009

(65) Prior Publication Data
US 2011/0064539 A1    Mar. 17, 2011

Related U.S. Application Data

(60) Provisional application No. 61/056,742, filed on May 28, 2008.

(51) Int. Cl.
*E04B 9/22*    (2006.01)
(52) U.S. Cl. .................. 52/506.05; 411/531; 411/399; 403/267; 52/786.1
(58) Field of Classification Search ............... 52/506.05, 52/204.593, 204.6, 204.62, 204.63, 204.7, 52/786.1, 786.11, 786.12, 786.13; 403/266–268; 411/399, 372.5, 372.6, 373, 531
See application file for complete search history.

(56) References Cited

U.S. PATENT DOCUMENTS

| 3,298,270 A | | 1/1967 | Launay | |
|---|---|---|---|---|
| 3,855,750 A | * | 12/1974 | Reiland | 52/363 |
| 3,896,867 A | | 7/1975 | Gill | |
| 4,250,668 A | * | 2/1981 | Harrison, Jr. | 52/39 |
| 4,436,367 A | * | 3/1984 | Lewis et al. | 385/26 |
| 5,073,070 A | | 12/1991 | Chang | |
| 5,540,514 A | | 7/1996 | Demars | |

(Continued)

FOREIGN PATENT DOCUMENTS
GB    906240 A    9/1962

OTHER PUBLICATIONS

International Search Report and Written Opinion on PCT/US2009/034277 (Mailed Apr. 15, 2009).

*Primary Examiner* — William Gilbert
*Assistant Examiner* — Beth Stephan
(74) *Attorney, Agent, or Firm* — Workman Nydegger

(57) ABSTRACT

Washer assemblies for mounting panels to a support without damaging the panels include a countersunk washer and a sleeve. In one implementation, the washer assemblies are configured to at least partially prevent the formation of hoop stresses within a panel, and uniformly transmit forces created by a fastener to a panel. The washer assemblies can be configured to enhance the function, look, feel, or aesthetic of a panel system. In addition, systems of at least one implementation of the present invention include a plurality of panels mounted to one or more supports using one or more washer assemblies and methods of mounting such systems.

20 Claims, 5 Drawing Sheets

U.S. PATENT DOCUMENTS

| | | | |
|---|---|---|---|
| 6,105,319 A * | 8/2000 | Brunt | 52/204.593 |
| 6,315,485 B1 | 11/2001 | Speck | |
| 6,377,445 B1 | 4/2002 | Davis | |
| 6,430,894 B1 * | 8/2002 | Chae et al. | 52/786.1 |
| 6,705,814 B2 | 3/2004 | Dobson | |
| 6,860,689 B1 | 3/2005 | Attanasio | |
| 7,213,375 B2 * | 5/2007 | Morgan et al. | 52/204.6 |
| 2002/0124512 A1 * | 9/2002 | Dean | 52/506.01 |

* cited by examiner

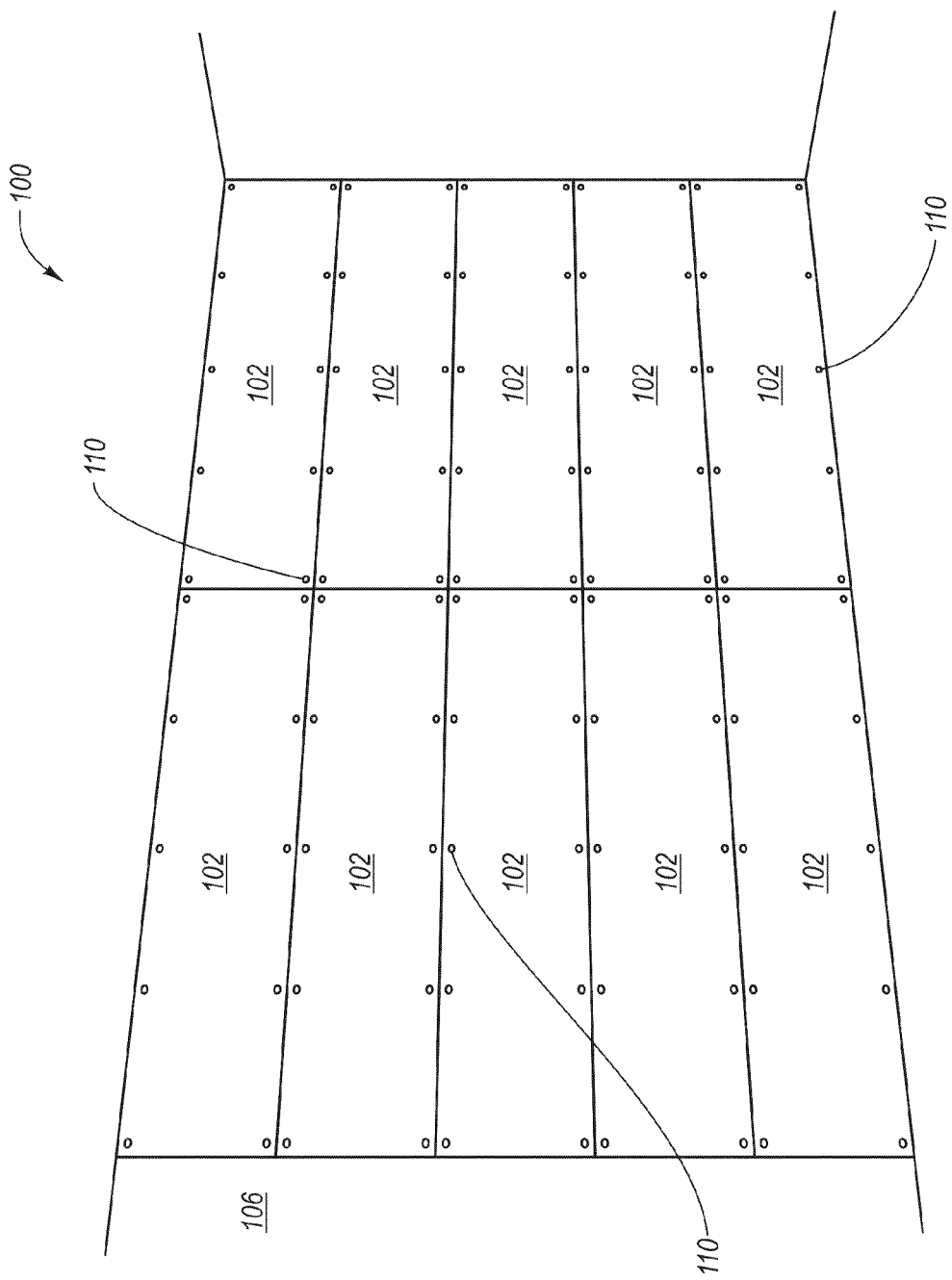
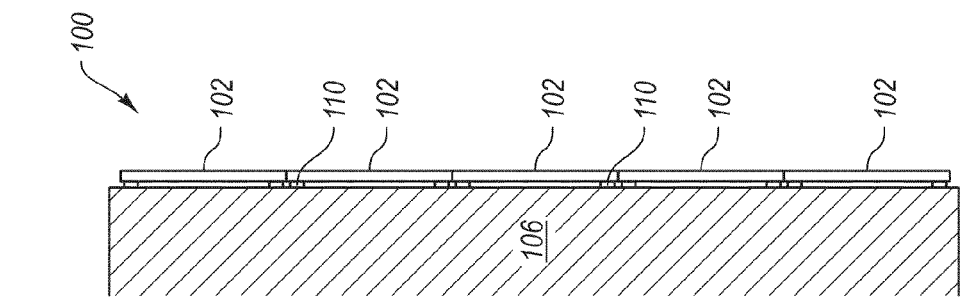

COUNTERSUNK FASTENER ASSEMBLIES, PANEL MOUNTING SYSTEMS, AND METHODS

CROSS-REFERENCE TO RELATED APPLICATIONS

The present invention is a U.S. National Stage Application corresponding to PCT Patent Application No. PCT/US2009/34277, filed Feb. 17, 2009, which claims the benefit of priority to U.S. Provisional Application No. 61/056,742, filed May 28, 2008. The entire content of each of the aforementioned applications is incorporated by reference herein.

BACKGROUND OF THE INVENTION

1. Field of the Invention

This invention relates to systems, methods, and apparatus for mounting and/or displaying panels as partitions, displays, barriers, treatments, or other structures.

2. Background and Relevant Art

Some recent architectural designs have implemented synthetic, polymeric resins, which may be used as partitions, displays, barriers, or treatments etc. In general, resin materials are now popular compared with decorative cast or laminated glass materials, since resin materials may be manufactured to be more resilient and to have a similar transparent, translucent, or colored appearance as cast or laminated glass, but with less cost. Decorative resins may also provide more flexibility compared with glass at least in terms of color, degree of texture, gauge, and impact resistance. Furthermore, decorative resins have a fairly wide utility since they may be formed to include a large variety of artistic colors, images, and shapes.

One particular use of decorative resins may be in the panel form, where the panel might be used in conjunction with a panel mounting system as part of a partition, display, barrier, treatment, or other structure. One conventional method of mounting a panel includes securing a panel to a support structure via a flat-headed, countersunk screw secured within a corresponding hole formed in the panel. Unfortunately, such conventional panel mounting hardware tends to suffer from a number of drawbacks. For example, conventional countersunk screws can lead to panel damage. In particular, the torque required to tighten a countersunk screw may create hoop stresses which can lead to panel cracking The tendency for countersunk screws to cause stress-cracking is often heightened by the ease and frequency with which countersunk screws tend to be over-tightened.

The tendency of conventional hardware to damage resin panels is often magnified with smaller gauge panels. Indeed, the thinner the panel, the greater the tendency for conventional hardware to crack or otherwise damage the panel. As such, using conventional mounting hardware to mount smaller gauge resin panels without damage can be extremely difficult, or at the very least, tends to require expensive and time consuming modifications and complicated installation procedures.

Another conventional type of panel mounting system includes mounting panels to a structure using one or more standoffs. In general, a standoff positions a panel at a "standoff" (or extended) position with respect to a support structure. To this end, a conventional standoff typically includes a standoff barrel that attaches to the given support structure on one end and a capped screw that threads into the standoff barrel on an opposing end. Typically, a panel is secured between the standoff barrel and the standoff cap.

While conventional standoff caps can reduce the creation of hoops stresses and accompanying stress-cracking often caused by countersunk screws, this type of conventional hardware can present its own drawbacks. For example, standoff caps are often unsightly, too noticeable, or do not provide an appropriate aesthetic for desired design environments. The unpleasant aesthetic of conventional mounting hardware is often magnified when used with translucent or transparent panels that magnify texture, light, color, and form. Thus, conventional mounting hardware may be unappealing to designers and architects seeking to obtain a certain aesthetic by using decorative architectural resin panels.

In particular, this undesired aesthetic is often a result of mounting hardware, such as a conventional standoff cap, protruding from the panel surface. In addition to providing an undesirable aesthetic, protruding standoff caps can also present various functional drawbacks. For instance, conventional, protruding standoffs typically do not allow for a panel to be mounted as a wall, countertop, or step with a substantially smooth or flush surface. Furthermore, a protruding standoff cap may reduce the usable surface area of the panel, and create a protruding structure upon which objects (such as loosing clothing etc.) can easily catch or hook.

Additionally, conventional mounting hardware, such as countersunk screws and standoffs, typically do not account for the unique material properties of resin panels. For example, resin panels may undergo significantly greater thermal expansion than metal or other conventional types of panels. Because conventional hardware typically does not expand and/or contract in the same way as resin panels, conventional hardware may often damage resin panels over time. For example, hardware that is too loose due to retraction of a panel can result in inappropriate shifting of the panel, which may cause the panel to crack. Similarly, hardware that is too tight due to the expansion of a panel may result in one or more of the components digging into the panel, which may result in cracks or fissures in the panel. Along similar lines, many conventional mounting hardware options employ a metal-to-panel interface, which can create stress concentrations in the panels that can eventually lead to the creation of cracks and other forms of damage.

Accordingly, there are a number of disadvantages in conventional panel mounting systems that can be addressed.

BRIEF SUMMARY OF THE INVENTION

Implementations of the present invention provide systems, methods, and apparatus for mounting panels as partitions, displays, barriers, treatments, or other structures that significantly reduce the likelihood of damaging the panels, in addition to providing a secure mount of a panel to a structure. For example, one or more implementations of the present invention include panel mounting hardware that reduces the creation of hoop stresses and associated stress-cracking in mounted panels. In particular, implementations of the present invention include countersunk washer assemblies that uniformly distribute stresses created by a fastener to a panel. Due at least in part to the ability to reduce hoop stresses and uniformly distribute stresses, the countersunk washer assemblies of the present invention can be used to securely mount panels having thinner gauges, while also reducing the likelihood of damaging the panels.

For example, one implementation of a countersunk washer assembly for securing an object, such as a decorative architectural resin panel, to a support structure can include a tapered sleeve configured in size and shape to receive therein a head of a fastener. The countersunk washer assembly can also include a countersunk washer having a tapered inner cavity configured in size and shape to receive the sleeve and the head of the fastener therein. Additionally, the countersunk washer can be configured to hold the sleeve and fastener in a substantially flush configuration.

Additionally, an implementation of a panel mounting system can include a fastener configured to be secured to a support structure, a tapered sleeve configured to at least partially receive and surround the head of the fastener, and a countersunk washer having a tapered inner cavity configured in size and shape to receive and hold the tapered sleeve and the head of the fastener in a substantially flush configuration. The panel mounting system can also include one or more panels having a recess configured to receive the countersunk washer, the tapered sleeve, and the head of the fastener. Furthermore, the tapered sleeve and countersunk washer can be configured to at least partially transmit forces uniformly from the fastener to the one or more panels.

In addition to the foregoing, an implementation of a method of mounting a resin panel to a support structure can involve forming a recess in a resin panel, inserting a countersunk washer having a tapered inner cavity within the recess of the resin panel, and inserting a sleeve within the tapered inner cavity of the countersunk washer. The method can also include inserting a fastener through the sleeve, the countersunk washer, and the recess of the resin panel, and then rotating the fastener to tighten the fastener and secure the resin panel to the support structure. Furthermore, during tightening of the fastener, the sleeve and the countersunk washer at least partially prevent the creation of hoop stresses in the resin panel.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7A illustrates a facing-perspective view of panel system including a plurality of panels mounted to a support structure via a plurality of countersunk washer assemblies in accordance with an implementation of the present invention;

FIG. 7B illustrates a end view of the panel system of FIG. 7A; and

DETAILED DESCRIPTION OF THE PREFERRED EMBODIMENTS

Figure 1:
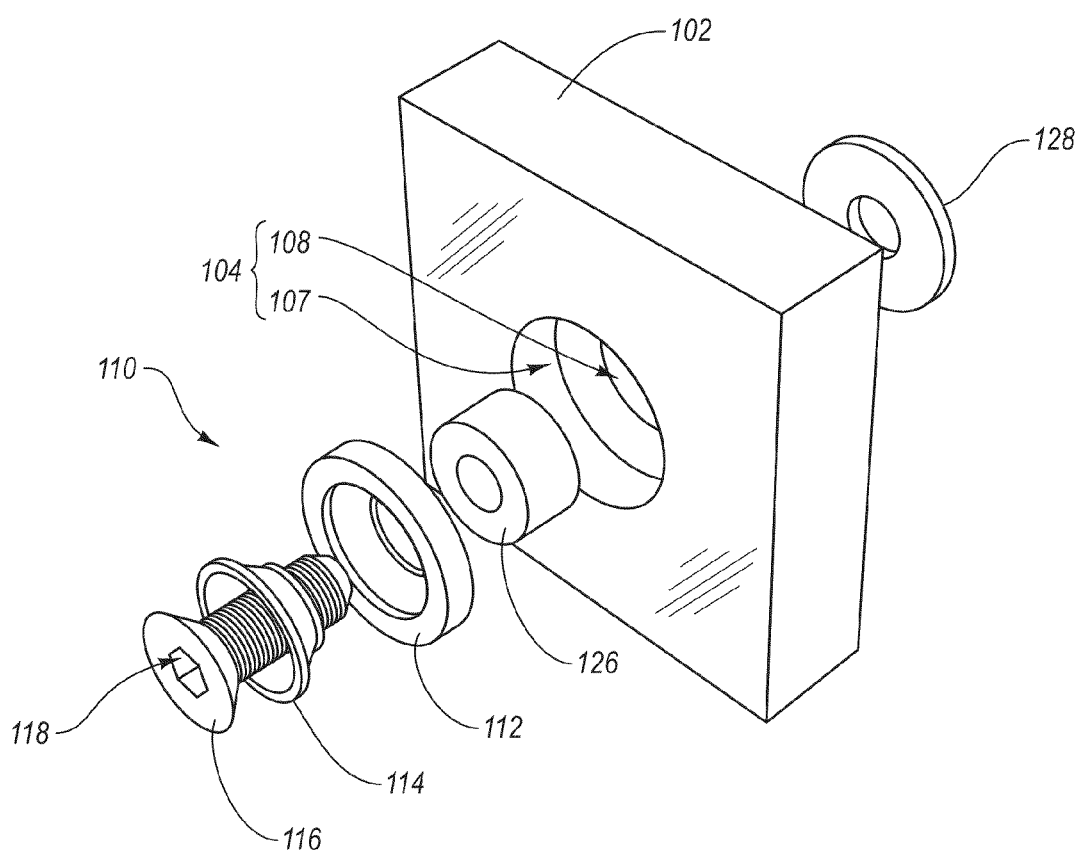
FIG. 1 illustrates an exploded, side perspective-view of an exemplary countersunk washer assembly and panel in accordance with an implementation of the present invention.

Implementations of the present invention provide systems, methods, and apparatus for mounting panels as partitions, displays, barriers, treatments, or other structures that significantly reduce the likelihood of damaging the panels, in addition to providing a secure mount of a panel to a structure. For example, one or more implementations of the present invention include panel mounting hardware that reduces the creation of hoop stresses and associated stress-cracking in mounted panels. In particular, implementations of the present invention include countersunk washer assemblies that uniformly distribute stresses created by a fastener to a panel. Due at least in part to the ability to reduce hoop stresses and uniformly distribute stresses, the countersunk washer assemblies of the present invention can be used to securely mount panels having thinner gauges, while also reducing the likelihood of damaging the panels.

Additionally, one will appreciate from the description provided herein that the components of the present invention can also prevent panel damage by accounting for the unique material properties of resin panels. For instance, one or more components of the present invention can be formed from materials configured to expand and contract in response to temperature changes at the same or similar rates as the panels with which they are used. Thus, one or more components of the present invention can reduce panel damage by helping to prevent or otherwise accommodate over-tightening and loosening of panel mounting hardware. Along these lines, one or more implementations of the present invention can include one or more components that provide a flexible/resilient barrier between the softer resin panels and harder mounting components, which can reduce the likelihood of panel damage.

Furthermore, one will appreciate from the description herein that implementations of the present invention can provide systems, methods, and apparatus for mounting panels as partitions, displays, barriers, treatments, or other structure with a great deal of aesthetic versatility. For example, implementations of the present invention include hardware components configured to reduce the visibility of or hide hardware mounting components. In particular, one or more implementations of the present invention includes hardware mounting components that can be transparent, translucent, or colored in order to blend-in with a panel or provide a desired aesthetic. Accordingly, implementations of the present invention can be easily configured for securely mounting panels of almost any gauge with a reduced likelihood of damage, while also providing a pleasing aesthetic.

As mentioned above, architects, designers, and assemblers may particularly choose to use the components of the present invention to mount resin panels because one or more components of the present invention can be configured to reduce the likelihood of damaging the resin panels, while also providing a please aesthetic. As used herein, the terms "resin panel" and "resin-based panel" refer to panels comprising substrate of one or more layers or sheets formed from any one of the following thermoplastic polymers (or alloys thereof). Specifically, such materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like.

As a preliminary matter, implementations of the present invention are described herein primarily with reference to mounting resin panels. One will appreciate, however, that a panel, particularly a resin-based panel, is only one type of "structure" with which the countersunk washer assemblies described herein can secure. For example, the countersunk washer assemblies of the present invention can be used to mount not only resin "panels," as such, but also glass or other types of panels, to a given support structure. Furthermore, one will appreciate that the mounting hardware, systems, and methods of the present invention can also be used to mount other types of structures having different material compositions, such as objects comprising wood, stone, fiberglass, or the like, which may or may not exhibit primarily panel-like dimensions as described herein. Reference herein, therefore, to panels, or even resin panels, as such, is primarily for convenience in description.

FIG. 1 illustrates an exploded, perspective view of a countersunk washer assembly 110 and panel 102 in accordance with an implementation of the present invention. FIG. 1 shows that the countersunk washer assembly 110 can include a countersunk washer 112 and a sleeve 114, which a user can use in tandem with a particularly configured fastener 116 to mount a panel 102 to a support structure 106 (e.g., FIGS. 7A-7B). In particular, a user can form a recess 104 (or "through-hole") within the panel 102 that is sized and configured to receive the countersunk washer assembly 110. According to some implementations of the present invention, the recess 104 can vary along its length. For example, FIG. 1 illustrates that the recess 104 can include a distal portion 108 and a larger proximal portion 107. As shown in FIG. 1, the distal portion 108 can include a hole having a diameter slightly larger than the diameter of the threaded rod portion of the fastener 116; while the proximal portion 107 of the recess 104 can include a counterbore corresponding in size and shape to the countersunk washer 112.

As mentioned previously, the countersunk washer assembly 110 can include a number of components that can allow a user (e.g., a manufacturer, assembler, engineer, designer, architect) to securely mount almost any gauge of panel 102, while also reducing the likelihood of damaging the panel 102. For example, the countersunk washer assembly 110 can securely and safely mount thicker gauge panels 102 (panels having a gauge between about one-half inch (½") and about two inches (2") or greater) and thinner gauge panels 102 (panels having a thickness of about one-half inch (½") or less). Indeed, using the countersunk washer assembly 110, a user can mount thinner gauge panels that conventional hardware tends to crack and otherwise damage. For example, the countersunk washer assembly 112 can allow a user to mount panels 102 having a thickness of between about one-eighth inch (⅛") and about one-thirty-second inch (1/32") with a reduced likelihood of damage.

The ability of the countersunk washer assembly 110 to securely mount panels of almost any gauge, without damaging the panels (or at least significantly reducing the likelihood of damaging the panels), is due at least in part to the ability of the countersunk washer 112 and sleeve 114 to prevent the creation of stress concentrations in the panel 102. For example, the countersunk washer 112 and the sleeve 114 can at least partially prevent the creation of torsional and hoop stresses in the panel 102, and at least partially ensure that forces are transferred uniformly from the fastener 116 to an area of the panel 102. The following describes more fully this force transfer/distribution.

In particular, FIG. 1 shows that the sleeve 114 can at least partially prevent the transfer of torsional forces created during the tightening of the fastener 116 to the panel 102. In particular, FIG. 1 illustrates that the sleeve 114 have a size and shape configured to receive the head of the fastener 116 therein. As explained in greater detail below, the walls 134 (FIG. 3) of the sleeve 114 can have a tapered/angled conformation corresponding to the head of the fastener 116. The tapered walls 134 of the sleeve 114 can allow the fastener 116 to rotate within or relative to the sleeve 114 during tightening. Therefore, a user can rotate and tighten the fastener 116 into a support structure or intermediate hardware, without the head of the fastener 116 digging into or even contacting the panel 102. Thus, the sleeve 114 can partially, if not entirely, prevent torsional forces from being transferred from the fastener 116 to the panel 102 during mounting of the panel 102.

Furthermore, the countersunk washer 112 can help ensure that some, if not all, forces exerted on the panel 102 due to the tightening of the fastener 116 are axial or compressive forces. For example, the countersunk washer 112 can include a tapered inner cavity 122 (FIG. 2) configured in size and shape to receive the tapered sleeve 114 and the tapered head of the fastener 116. The outer sides and bottom surfaces of the countersunk washer 112, however, can form a substantially cylindrical geometry. Thus, the countersunk washer 112 can absorb some, if not all, of any sideways (or non axial forces) created by the tapered head of the fastener 116 and transfer it to panel 102 as axial forces. Thus, the countersunk washer 112 can help prevent the creation of hoop stresses in the panel 102, and therefore, help reduce panel cracking and other damage.

Additionally, the countersunk washer 112 can distribute the forces created by the tightening of the fastener 116 uniformly across an increased area of the panel 102. As shown in FIG. 1, the surface area of the countersunk washer 112 that contacts the panel 102 is significantly larger than the surface area of the head of the fastener 116. One will appreciate therefore, that the countersunk washer 112 distributes the forces created by the fastener 116 to a larger area of the panel 102 then the fastener would alone. Thus, the countersunk washer 112 can help prevent the creation of stress concentrations in the panel 102. The reduction in the creation of stress concentration, in turn, can help reduce the creation of cracks and other forms of panel damage.

As mentioned previously, the countersunk washer assembly 110 can further include various features and components to aid in protecting the panel 102 from damage both during installation and after. For example, FIG. 1 illustrates that the countersunk washer assembly 110 can include various washers and bushings (e.g., 126, 128) to prevent the panel 102 from being damaged by contact with harder components of the countersunk washer assembly 110.

In particular, FIG. 1 illustrates that the countersunk washer assembly 110 can include a washer 128, which a user can secure on the fastener 116 between the panel 102 and the support structure (wall, ceiling, floor, etc.) or intermediate hardware (anchor, frame, standoff barrel etc.) to which the panel 102 is mounted. In one implementation, the washer 128 comprises an at least partially flexible material (or other material consistent with the material of the panel 102) such as a resin or rubber material, and thus provides a flexible, cushioning barrier between the harder support structure (or intermediate hardware) and the softer material of the panel 102. Therefore, the washer 128 can help ensure that the panel 102 is not scratched during installation. Additionally, the washer 128 can help ensure that the edges of any intermediate hardware do not dig into and create stress concentrations within the panel 102 that may eventually lead to panel damage. The washer 128 can particularly help prevent panel damage when used with glass and acrylic panels, which are particularly susceptible to damage when mounted against a metal interface.

FIG. 1 further illustrates that the countersunk washer assembly 110 can include a bushing 126. The bushing 126, similar to the washer 128, can also comprise an at least partially flexible material (or other material consistent with the material of panel 102), and thus can act as a flexible barrier between the panel 102 and the harder components of the countersunk washer assembly 110. As shown in FIG. 1, the bushing 126 can include a hollow, cylindrical body.

The cylindrical body of the bushing 126 can have a size and shape configured to allow it to be inserted within the recess 104 of the panel 102, and more particularly within the distal portion 108 of the recess 104. The bushing 126 can span at least the length of the distal portion 108 of the recess 104 to help ensure that the fastener 116 does not directly contact the panel 102. One will appreciate in light of the disclosure herein that the bushing 126 can act as a barrier between the softer panel 102 and the harder fastener 116. Thus, the bushing 126 can help ensure that the weight of the panel 102 resting upon countersunk washer assembly 110 does not cause the fastener 116 or other component of the countersunk washer assembly 110 to dig into or otherwise damage the panel 102.

One will appreciate in light of the disclosure herein that the washer 128 and the bushing 126 can be formed from polytetrafluoroethylene, rubber, nylon, or other suitable material that is light weight, durable, and that can provide a resilient barrier between the harder components of the countersunk washer assembly 110 and a panel 102. Additionally, in one or more implementations, the washer 128 and/or the bushing 126 can be formed from a material configured with approximately the same or similar coefficient of thermal expansion as the panel 102. Thus, the washer 126 and the bushing 126 can expand and contract at approximately the same rate as the panel 102 and thereby help ensure that there is always an adequate barrier between the harder components of the countersunk washer assembly 110 and the softer panel 102.

Figure 2:
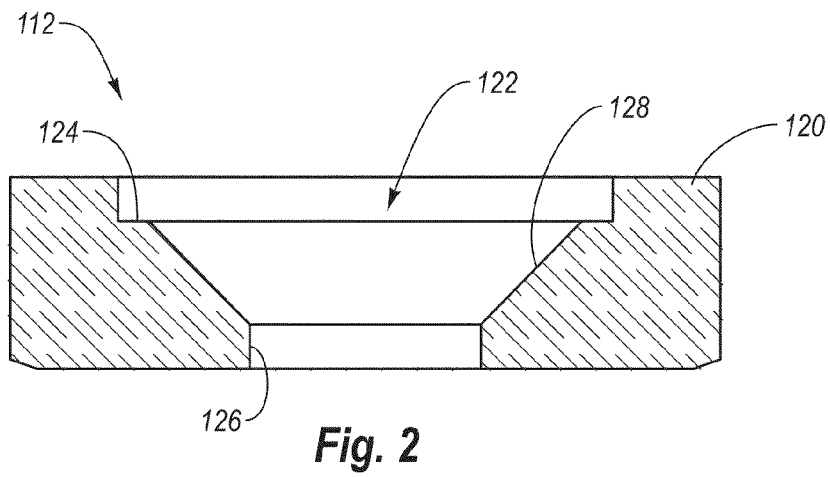
FIG. 2 illustrates a side cross-sectional view of a countersunk washer of the countersunk washer assembly of FIG. 1.

FIG. 2 and the corresponding text, illustrates or describes a number of details and features of the countersunk washer 112 shown in FIG. 1. For example, FIG. 2 illustrates a side cross-sectional view of a countersunk washer 112 of a countersunk washer assembly 110 according to an implementation of the present invention. As an initial matter, the countersunk washer 112 can be formed from polycarbonates, polyesters, copolyesters, acrylics, and/or mixtures thereof. One will appreciate, however, that these and other components described herein can be formed from any number of synthetic or naturally occurring resins, rubbers, glass, and/or composites thereof. In any case, the countersunk washer 112 can provide an accommodating and secure interface between the relatively inflexible fastener 116 and the relatively flexible panel 102.

In at least one implementation, the countersunk washer 112 can be formed from the same material as the panel 102 which it secures, or a material with approximately the same or similar coefficient of thermal expansion as the panel 102. Thus, the countersunk washer 112 can expand and contract at approximately the same rate as the panel 102 and thereby help ensure that there is always an adequate barrier between the harder components of the countersunk washer assembly 110 and the softer panel 102. One will appreciate that ability of the countersunk washer 112 to expand and contract in tandem with the panel 102 can help prevent the panel 102 from contracting upon hardware and creating stresses that can lead to panel damage.

Additionally, the shape of the countersunk washer 112 can help reduce the creation of stress concentrations in the panel 102. For example, as shown in FIGS. 1 and 2, the body 120 of the countersunk washer 112, when viewed from top, can have a circular cross-section. Thus, the portion of the countersunk washer 112 that abuts the panel 102 may not include corners and sharp edges. The circular cross-section of the countersunk washer 112 can help reduce point stress caused at the interface between the countersunk washer 112 and a panel 102, which in turn can help minimize the creation of cracks and other forms of damage in a panel 102. One will appreciate in light of the disclosure herein that the body 120 of the countersunk washer 112 can include various shapes and geometries in addition to a circular cross-section. For example, according to additional implementations of the present invention, the cross-section of the body 120 can have an oval, elliptical, or even square shape.

Referring again to FIG. 2, the body 120 of the countersunk washer 112 can comprise a countersunk recess 122. The countersunk recess 122 can have a size and shape to allow it to receive the sleeve 114 and the head of the fastener 116. In particular, the countersunk recess 122 can include surface features adapted to engage corresponding features of the sleeve 114. For instance, FIG. 2 illustrates that the countersunk washer 112 can include a tapered wall 128 extending between a shelf 124 and a collar 126. The wall 128 of the countersunk recess 122 can have a taper corresponding to the taper of the outer walls of the sleeve 114.

The shelf 124 can form a surface upon which at least a portion of the sleeve 114 may abut and rest against. Furthermore, the collar 126 can have a size configured to allow it to engage the outer surfaces of the sleeve 114. One will appreciate that the shelf 124 and the collar 126 can help ensure that the sleeve 114 does not shift or slide within the countersunk recess 122 of the countersunk washer 112 during installation.

Furthermore, in order to further reduce the tendency of the sleeve to shift or slide within the countersunk recess 122 of the countersunk washer 112, the shelf 124 and the collar 126 can have a snap-fit engagement with corresponding features of the sleeve 114. In one or more implementations, means (i.e., "engagement means") other than a snap-fit engagement can secure the sleeve 114 within the countersunk recess 122 of the countersunk washer 112. As non limiting examples, the sleeve 114 and countersunk recess can have an interference fit or solely be held together by the force exerted by the fastener 116.

Figure 3:
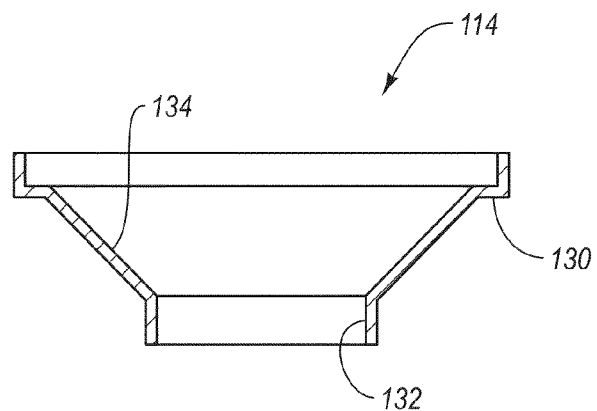
FIG. 3 illustrates a side cross-sectional view of a sleeve of the countersunk washer assembly of FIG. 1.

FIG. 3 and the corresponding text, illustrates or describes a number of details and features of the sleeve 114 of the countersunk washer assembly 110. For example, FIG. 3 illustrates a side cross-sectional view of a sleeve 114. As a preliminary matter, one will appreciate that the sleeve 114 can be formed from a metal, such as stainless steel. Of course, the sleeve 114 can also be formed from any suitable material that is lightweight, strong, and provides an appropriate aesthetic, such as, for example, aluminum, copper, or brass.

As described above, the external surface features of the sleeve 114 can have a size and shape to allow these features to engage the internal surface features of the countersunk washer 112. Additionally, the internal surface features or walls 134 of the sleeve 114 can receive a fastener 116 as shown in FIG. 1. For example, a lip 130 and a stem column 132 can have a size and shape corresponding to the external features of a fastener 116. In one or more implementations, the stem column 132 can have an internal diameter larger than the outer diameter of the fastener 116. The clearance between the stem column 132 and the fastener 116 can help ensure that the threads of the fastener 116 are not damaged by the sleeve 114. In one or more additional implementations, however, the stem column 132 can include internal threads configured to engage the threads of the fastener 116. In the embodiments shown in the Figures, the sleeve 114 is adapted to receive a flat-head, tapered screw; however, one will appreciate that the sleeve 114 can have a size and shape to allow it to receive various types of fasteners.

In general, the sleeve 114 can provide a barrier between the fastener 116 and the softer countersunk washer 112 and panel 102. The sleeve 114 thus helps protect the panel 102 from some, if not all, the damage that fastener 116 could cause during tightening and after. Additionally, the sleeve 114 can account for any variances in fasteners 116 due to manufacturing tolerances, and can prevent such from causing stress concentrations or otherwise damaging the panel 102.

Figure 4:
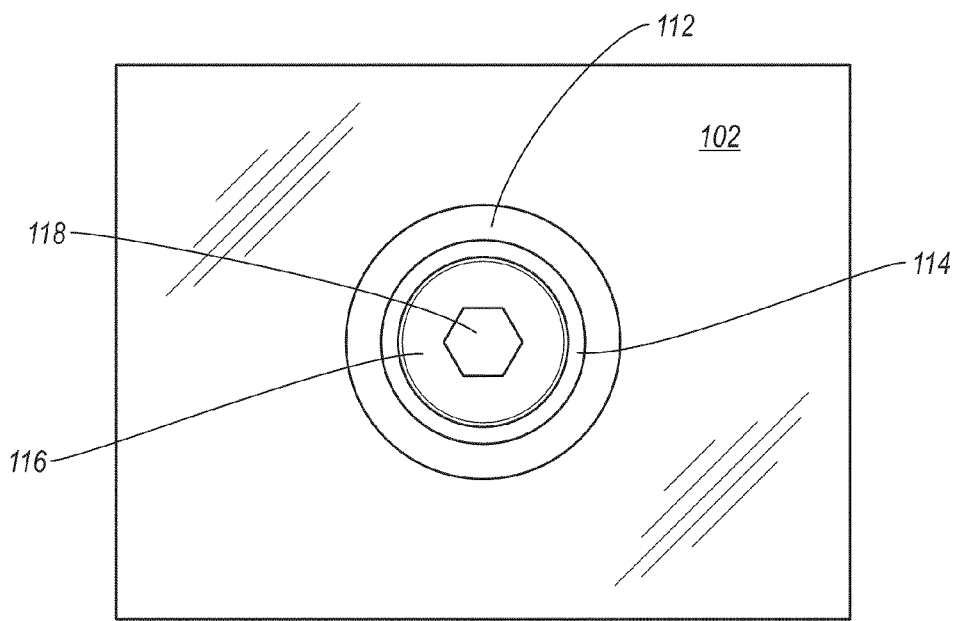
FIG. 4 illustrates an assembled facing view of the countersunk washer assembly and panel of FIG. 1.

One will appreciate in light of the disclosure herein, that in addition to helping prevent panel damage, the countersunk washer assemblies 110 of the present invention can also help reduce the visibility of mounting hardware, and thus, help magnify the aesthetic properties of a given panel 102 or panel system. For example, FIG. 4 illustrates an assembled, front view of the countersunk washer assembly 110 and panel 102 of FIG. 1 in accordance with an implementation of the present invention. As shown in FIG. 4, the countersunk washer 112 can have a size and shape to allow it to receive and hold both the sleeve 114 and the head of the fastener 116 in a substantially flush, secure configuration. In other words, a user can position the head of the fastener and the proximal surfaces of the sleeve 114 and the countersunk washer 112 so they are all substantially flush to form a generally flat and continuous surface, which tightly holds the panel 102 in position.

Furthermore, according to some implementations of the present invention, the recess 104 of the panel 102 can be deep enough to allow the head of the fastener 116 and the proximal surfaces of the sleeve 114 and the countersunk washer 112 to be substantially flush with the proximal surface of the panel 102. Thus, in at least one implementation, none of the components of the countersunk washer assembly 110 protrude generally beyond the display surface or proximal surface of the panel 102. Because, in such implementations, no hardware extends beyond the proximal surface of the panel 102, the countersunk washer assembly 110 can reduce the visibility of mounting hardware, particularly when viewed from the side. Furthermore, one will appreciate that because the countersunk washer assembly 110 can mount a panel 102 with a substantially flat and flush surface, panels mounted with the countersunk washer assemblies can further include an increased, usable surface area, substantially free of protrusions upon which objects (such as loosing clothing etc.) can easily catch or hook.

In addition to the low-profile of the countersunk washer assembly 110, the components of the countersunk washer assembly 110 can have a color and transparency to further reduce their visibility. For example, in at least one implementation of the present invention, the transparency and color of the countersunk washer 112 can correspond to the transparency and color of the panel 102 with which it is used. Thus, the countersunk washer 112 can blend in with the panel 102 to reduce its visibility. In one or more implementations, the color and/or transparency of the countersunk washer 112 can differ from that of the panel 102 in order to provide a desired aesthetic.

In yet at least one additional implantation, the proximal surface of at least one of the countersunk washer 112 and the sleeve 114 can have a square, rectangular, star, or other desired cross-sectional shape when viewed from the top in order to provide a desired aesthetic. As the forgoing description indicates, the countersunk washer 112 and countersunk washer assembly 110 provide a designer/architect with aesthetic versatility. Indeed, the countersunk washer assembly 110 enables a designer/architect to replace unsightly conventional hardware with hardware that is capable of providing a wide variety of aesthetic effects.

Figure 5:
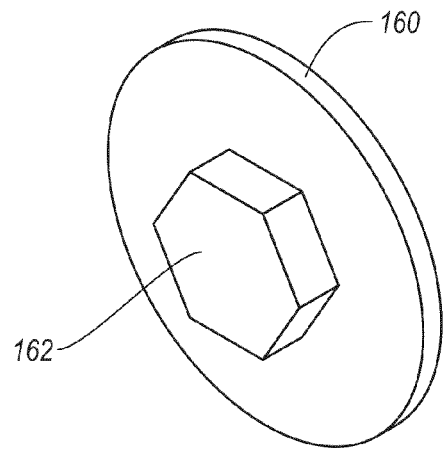
FIG. 5 illustrates a perspective side view of a fastener cap in accordance with an implementation of the present invention.

Additionally, according to further implementations of the present invention, the countersunk washer assembly 110 can include a cap that can at least partially conceal the countersunk washer assembly 110 from view. For example, FIG. 5 illustrates a perspective view of a cap 160 that conceals the countersunk washer assembly 110. To this end, FIG. 5 shows that the cap 160 can include a body and a plug 162. In one implementation, a user can insert the plug 162 within the receptacle 118 (FIG. 4) of the fastener 116 to allow the body of the cap 160 to cover the head of the fastener 116 and the proximal surfaces of the countersunk washer 112 and sleeve 114.

Figure 6:
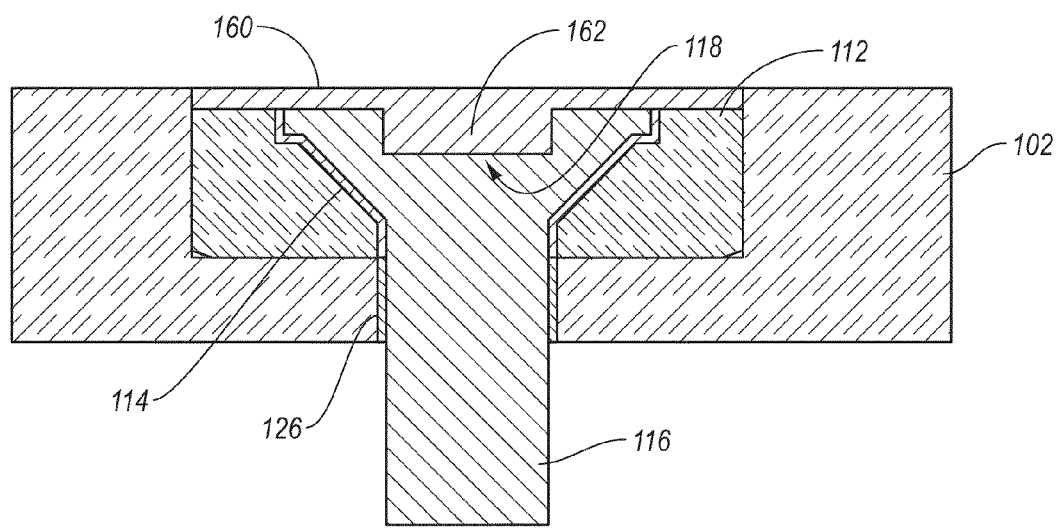
FIG. 6 illustrates a side cross-sectional view of a panel and a countersunk washer assembly including the fastener cap of FIG. 5.

For example, FIG. 6 illustrates a side cross-sectional view of a panel 102 and countersunk washer assembly 110 that includes a cap 160. As shown in FIG. 6, a user can form the counterbore 107 (e.g., FIG. 1) into the panel 102 to a depth equal to the combined thickness of the countersunk washer 112 and the cap 160. The user can then insert the bushing 126, countersunk washer 112, sleeve 114, and fastener 116 into the recess 104 (e.g., FIG. 1) of the panel 102. The user can then insert a tightening tool (such as "flat head" or "phillips" screwdriver or an "allen" wrench) into the receptacle 118 of the fastener 116 and secure it directly or indirectly to a support surface. After tightening the fastener 116, the user can insert the plug 162 of the cap 160 in the receptacle 118 of the fastener 116 to conceal or cover the countersunk washer assembly 110 with the cap 160.

One will appreciate that the cap 160 can have a transparency/translucency and color that corresponds to the transparency/translucency and color of the panel 102 with which it is used. Thus, the cap 160 can be configured to blend in with the panel 102, thereby reducing the visibility of the countersunk washer assembly 110. Of course, one will appreciate that the color and transparency of the cap 160 can differ from that of the panel 102 in order to provide a desired aesthetic.

As mentioned previously, the countersunk washer assembly 110 can securely mount panels 102 to a support structure without damaging the panels 102, while also providing a pleasing aesthetic. For example, FIGS. 7A and 7B illustrate perspective facing and end views, respectively, of a schematic diagram of a system 100 comprising a plurality of panels 102 mounted as a treatment to a support structure 106. As shown, one or more countersunk washer assemblies 110 secure each panel 102 of the plurality of panels 102 to a support structure 106. As discussed above, the countersunk washer assemblies 110 can secure the panels 102 to the support structure 106 in a manner that the countersunk washer assemblies 110 (i.e., countersunk washer 112, sleeve 114, and fastener 116) and the panels 102 (i.e., the proximal, visible outside surface of the panels 102) form a substantially smooth and flat surface as shown in FIG. 7B.

Figure 8:
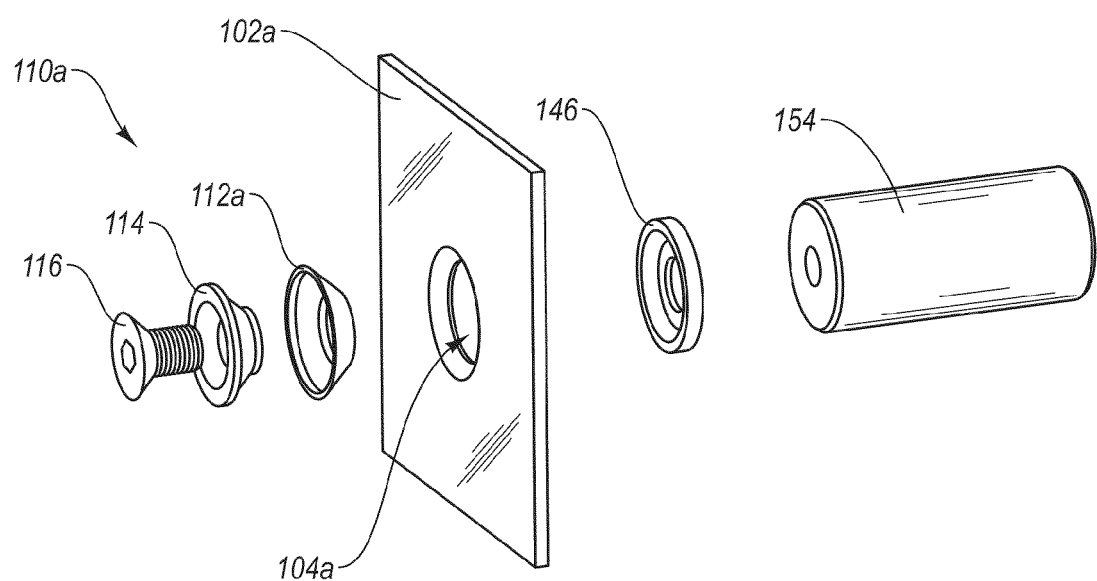
FIG. 8 illustrates an exploded, side perspective-view of another exemplary countersunk washer assembly using a standoff barrel in accordance with an implementation of the present invention.

When mounting panels having a thinner gauge (i.e., panels having a gauge or thickness of less than about five-sixteenths of an inch (⁵⁄₁₆″)) it may be difficult or impossible to form a counterbore within the panel to securely hold a countersunk washer. Thus, when mounting thinner gauge panels, a user may implement a countersunk washer configured for use with thinner gauge panels. For example, FIG. 8 illustrates an exploded, perspective view of a countersunk washer assembly 110a configured for use with a thinner gauge panel 102a in accordance with an implementation of the present invention. As illustrated by FIG. 8, the countersunk washer assembly 110a can include a countersunk washer 112a and a sleeve 114, which a user can use in tandem with a fastener 116 to mount the panel 102a to a support structure 106 (FIGS. 7A-7B).

As shown in FIG. 8, the countersunk washer 112a can include interior features substantially similar to the countersunk washer 114. In other words, the countersunk washer 112a can include a shelf 124, a collar 126, and a tapered inner wall 128. Thus, the countersunk washer 112a can receive and hold a sleeve 114 and head of a fastener 116, similar to the countersunk washer 114 described herein above. The outer surface of the countersunk washer 112a, however, may differ from the outer surface of the countersunk washer 114. In particular, instead of having a generally cylindrical shape, the outer surface of the countersunk washer 112a can have a taper as shown in FIG. 8.

FIG. 8 further illustrates that a user can insert the countersunk washer 112a within a correspondingly tapered or countersunk recess 104a of a panel 102a. In particular, the user can position the countersunk washer 112a to extend at least partially through the tapered recess 104a. In such implementations where the length of the countersunk washer 112a exceeds the gauge of the panel 102a, the user can use a base or back bushing 146. In order to compensate for the smaller gauge panel 102a, a user can position the back bushing 146 on the fastener 126 between the panel 102a and the support structure or intermediate hardware (such as, for example, a standoff barrel 154). An inner cavity of the back bushing 146 can then receive the portion of the countersunk washer 112a that extends beyond the panel 102a. The back bushing 146 can help protect the panel 102a by preventing it from shifting onto or along the length of the fastener 116.

According to some implementations of the present invention, a user can form a countersunk recess 104a and use corresponding hardware, as shown in FIG. 8, with panels 102a formed from glass. On the other hand, the user can form a counterbore recess 104 and use corresponding hardware, as shown in FIG. 1, with panels 102 formed from resin materials. Similarly, the user can use a countersunk recess a countersunk recess 104a and corresponding hardware, as shown in FIG. 8, with thinner gauge panels 102, and a counterbore recess 104 and corresponding hardware, as shown in FIG. 1, with thicker gauge panels 102.

Implementations of the present invention also include methods of assembling and securing panels as a partition, display, treatment, barrier, or other structure to a support structure. The following describes at least one implementation of a method of mounting panels 102 to a support structure 106 using the countersunk washer assemblies 110(a). Of course, as a preliminary matter, one of ordinary skill in the art will recognize that the methods explained in detail can be modified in a wide variety of ways to install a wide variety of configurations using one or more components of the present invention. In particular, various acts of the method described below can be omitted or expanded, and the order of the various acts of the method described can be altered as desired. Thus, one should view the following acts or steps as exemplary of one implementation of a method in accordance with the present invention.

For example, in at least one method of the present invention, a user (e.g., manufacturer or assembler) can secure at least one panel 102(a) to a support structure 106 using one or more countersunk washer assemblies 110(a). Specifically, with reference to the components and diagrams of FIGS. 1-8, a user can form at least one recess 104(a) within the panel 102(a) at a predetermined support location. In particular, the user can size and configure the at least one recess 104(a) in shape and depth to receive at least a portion of a countersunk washer assembly 110(a) therein. For example, according to some implementations of the present invention, the user may form a substantially cylindrical recess 104 completely through the panel 102. The user then may increase the size of the proximal portion 107 of the recess 104 by forming a counterbore in the panel 102. According to additional implementations, the user may form a tapered recess 104a at a predetermined support location.

One will appreciate that the thinner the gauge of panel 102(a) used, the fewer the number of support locations that may be needed to support the weight of the panel 102(a); however, the greater the number of support locations that may be needed to prevent deflection of the panel 102(a). On the other hand, the thicker the gauge of panel 102(a) the greater the number of support locations that may be needed to hold the weight of the panel 102(a); but the lesser the number of support locations that may be needed to prevent defection of the panel 102(a).

In any event, after forming the at least one recess 104(a) within the panel 102(a) at a predetermined support location, the user can insert a countersunk washer 112(a) having a tapered inner cavity within the at least one recess 104(a) of the panel 102(a). According to some implementations of the present invention, the user may insert the countersunk washer 112 into the at least one recess 104 until its distal surface rests against the bottom of a counterbore 107 formed in the panel 102. According to further implementations, the user can position at least a portion of the countersunk washer 112a completely through the panel 102a and into a back bushing 146.

Once, or even before, inserting the countersunk washer 112(a) into the recess 104(a) of the panel 102(a), the user can insert a sleeve 114 within a tapered inner cavity 122 of the countersunk washer 112(a). In particular, the user can abut a lip 130 of the sleeve 114 against a shelf 124 of the countersunk washer 112(a). According to some implementations of the present invention, the user can snap-fit the sleeve 114 into the tapered inner cavity 122 of the countersunk washer 112(a).

After having positioned the countersunk washer 112(a) and the sleeve 114 into the recess 104(a) of the panel 102(a), the user can insert a tapered fastener 116 through the sleeve 114, the countersunk washer 112(a), and the recess 104(a) of the panel 102(a). The user can then position the distal end of the fastener 116 either directly or indirectly into a support surface 106. For example, the user can position the distal end of the tapered fastener 116 to a piece of intermediate hardware secured to the support surface 106, such as for instance, a standoff barrel 154, an anchor, a frame, or a flange. Alternatively, the user can position the distal end of the fastener 116 directly into a tapped hole formed directly in the support surface 106.

The method can further include positioning one or more washers or bushings on the fastener 116. For example, the user can position a washer 128 or back bushing 146 on the fastener 116 between the panel 102(a) and the support structure 106 or intermediate hardware (e.g., standoff barrel 154). Additionally, the user can position a bushing 126 on the fastener 116 directly behind the countersunk washer 112(a) to prevent the fastener 116 from contacting any portion of the panel 102(a).

The user can then secure the panel 102(a) to the support structure 106 by rotating the fastener 116 to tighten it into the support structure 106 or intermediate hardware. In particular, the user can rotate the fastener 116 within the sleeve 114 so that the fastener 116 rotates relative to the sleeve 116. According to some implementations of the present invention, the sleeve can indicate to the user that the fastener 116 is sufficiently tightened. Specifically, the user can know that the fastener 116 is sufficiently tightened when the fastener 116 ceases to rotate relative to the sleeve 114. Thus, the sleeve 114 can help ensure that hoop stresses are not created in the panel 102(a), and help ensure that the fastener 116 is not over-tightened.

The method can further include at least partially concealing the countersunk washer assembly 110(a). For example, a user can insert a cap 160 within a receptacle 118 of the fastener 116 and cover the proximal surfaces of the fastener 116, sleeve 114, and countersunk washer 112(a). The user can also position the cap 160 in a substantially flush configuration with a proximal surface of the resin panel 102(a).

Accordingly, the various features and components of the present invention allow a user to mount almost any gauge of panel to a support without damaging the panel. This is possible at least in part since the mounting systems of the present invention do not require complicated hardware and installation processes that lack the ability to account for the unique characteristics of resin panels. This is also at least in part since the countersunk washer assemblies of the present invention can provide a buffer between the panel and any mounting hardware. It is further possible because the countersunk washer assemblies can avoid creating point stresses in the panel by uniformly distributing stresses first to a countersunk washer and then in turn to an area of the panel. Finally, the mounting systems of the present invention can help reduce panel damage by reducing the creation of hoop stresses in the panel, and by helping ensure that fasteners are not over-tightened.

Additionally, the various features and components of the present invention provide mounting hardware that is capable of providing aesthetic variability. For example, a manufacturer can configure various components of the present invention to be transparent, or otherwise blend with a panel to reduce the visibility of mounting hardware. Accordingly, implementations of the present invention can easily and securely mount panels of almost any gauge with a reduced likelihood of damage, while also providing a pleasing aesthetic.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A countersunk washer assembly for mounting an object, such as a decorative architectural resin panel having a visible outside surface, to a support structure comprising:
   a tapered sleeve configured in size and shape to receive therein a head of a fastener; and
   a countersunk washer including a top surface, an opposing bottom surface, and a cylindrical outer wall extending from the top surface to the bottom surface, the cylindrical outer wall having a substantially constant outer diameter between the top surface and the opposing bottom surface, the countersunk washer further having a tapered inner cavity configured in size and shape to receive the sleeve and the head of the fastener therein;
   wherein the countersunk washer is configured to hold the sleeve and fastener in a substantially flush configuration relative to the visible outside surface of the panel.

2. The assembly as recited in claim 1, wherein: the countersunk washer comprises one or more of a polycarbonate, a polyester, a copolyester, an acrylic, or mixtures thereof, and the sleeve comprises metal.

3. The assembly as recited in claim 1, wherein the tapered inner cavity of the countersunk washer further comprises a shelf configured to hold at least a portion of the sleeve and to prevent the sleeve from shifting relative to the countersunk washer.

4. The assembly as recited in claim 1, wherein the countersunk washer is transparent.

5. The assembly as recited in claim 1, further comprising an additional a washer configured to provide a barrier between the mounted object and a support structure.

6. The assembly as recited in claim 1, further comprising a cylindrical bushing configured to provide a barrier between a fastener and the mounted object.

7. The assembly as recited in claim 1, further comprising a standoff barrel configured to secure the mounted object to a support structure at an extended distance.

8. The assembly as recited in claim 1, wherein the sleeve is configured to be snap-fit within the tapered inner cavity of the countersunk washer.

9. The assembly as recited in claim 1, wherein one or more of the top surface and the opposing bottom surface of the countersunk washer comprises a beveled edge.

10. A panel mounting system, comprising:
    fastener configured to be secured to a support structure;
    a tapered sleeve configured to at least partially receive and surround the head of the fastener;
    a countersunk washer including a to surface, an opposing bottom surface, and a cylindrical outer wall extending from the to surface to the bottom surface, the cylindrical outer wall having a substantially constant outer diameter between the to surface and the opposing bottom surface, the countersunk washer further having a tapered inner cavity configured in size and shape to receive and hold the tapered sleeve and the head of the fastener in a substantially flush configuration; and
    one or more panels including a recess configured to receive the countersunk washer, the tapered sleeve, and the head of the fastener;
    wherein the tapered sleeve and countersunk washer are configured to at least partially transmit forces uniformly from the fastener to the one or more panels.

11. The system as recited in claim 10, wherein the countersunk washer is formed from the same material as the one or more panels.

12. The system as recited in claim 10, wherein the countersunk washer is formed from a material having substantially the same coefficient of thermal expansion as the one or more panels.

13. The system as recited in claim 10, further comprising a cap configured to be inserted within the recess of the one or more panels and cover the head of the fastener, the sleeve, and the countersunk washer.

14. The system as recited in claim 10, wherein the recess comprises a tapered through-hole.

15. The system as recited in claim 10, further comprising a back bushing configured to receive a portion of the countersunk washer positioned through the recess of the one or more panels.

16. A method of mounting a resin panel to a support structure, comprising:
   forming a through-hole having a first diameter in a resin panel;
   increasing the diameter of a proximal portion of the through-hole by forming a cylindrically-shaped counterbore having a constant outer diameter in the resin panel;
   inserting a countersunk washer into the cylindrically-shaped counterbore, the countersunk washer having a tapered inner cavity;
   inserting a sleeve within the tapered inner cavity of the countersunk washer;
   inserting a fastener through the sleeve, the countersunk washer, and the through-hole of the resin panel; and
   rotating the fastener to tighten the fastener and secure the resin panel to the support structure;
   wherein the material and shape of the sleeve and the countersunk washer reduce the creation of hoop stresses in the resin panel during tightening of the fastener.

17. The method as recited in claim 16, further comprising positioning the proximal surfaces of the sleeve and countersunk washer in a substantially flush configuration with a surface of the resin panel.

18. The method as recited in claim 16, further comprising positioning at least a portion of the countersunk washer completely through the resin panel and into a bushing.

19. The method as recited in claim 16, wherein rotating the fastener comprises rotating the fastener relative to the sleeve and countersunk washer.

20. The method as recited in claim 16, further comprising inserting a cap within a receptacle of the fastener and positioning the cap in a substantially flush configuration with a surface of the resin panel.

* * * * *

UNITED STATES PATENT AND TRADEMARK OFFICE
CERTIFICATE OF CORRECTION

PATENT NO. : 8,171,690 B2
APPLICATION NO. : 12/992329
DATED : May 8, 2012
INVENTOR(S) : Ghatikar et al.

It is certified that error appears in the above-identified patent and that said Letters Patent is hereby corrected as shown below:

Column 1
Line 24, change "treatments etc." to --treatments, etc.--
Line 28, change "appearance as cast" to --appearance to cast--
Line 56, change "or at the very least," to --or, at the very least,--

Column 2
Line 2, change "hoops stresses" to --hoop stresses--

Column 4
Line 55, change "apparatus" to --apparatuses--
Line 63, change "blend-in" to --blend in--

Column 5
Line 6, change "please aesthetic" to --pleasing aesthetic--
Line 24, change "with which the" to --which the--
Line 53, change "fastener 116;" to --fastener 116,--

Column 6
Line 21, change "have a size" to --has a size--
Line 54, change "appreciate" to --appreciate,--
Line 57, change "then the fastener" to --than the fastener--

Column 7
Line 10, change "panel 102)" to --panel 102),--
Line 46, change "or other suitable" to --or any other suitable--
Line 47, change "light weight" to --lightweight--

Signed and Sealed this
Nineteenth Day of March, 2013

Teresa Stanek Rea
*Acting Director of the United States Patent and Trademark Office*

Column 11
Line 9, change "surface" to --surface,--
Line 28, change "washer 114" to --washer 112--
Line 32, change "countersunk washer 114" to --countersunk washer 112--
Line 34, change "countersunk washer 114" to --countersunk washer 112--

Column 12
Line 29, change "104*a*" to --104(*a*)--
Line 33-34, change "panel 102(*a*); however," to --panel 102(*a*), but--
Line 38, change "102(*a*);" to --102*(a)*,--

Column 13
Line 20, change "sleeve 116" to --sleeve 114--

Column 14
Line 35, change "additional a" to --additional--
Line 53, change "a to surface" to --a top surface--
Line 55, change "a to surface" to --a top surface--
Line 57, change "a to surface" to --a top surface--